United States Patent Office
3,160,107
Patented Dec. 8, 1964

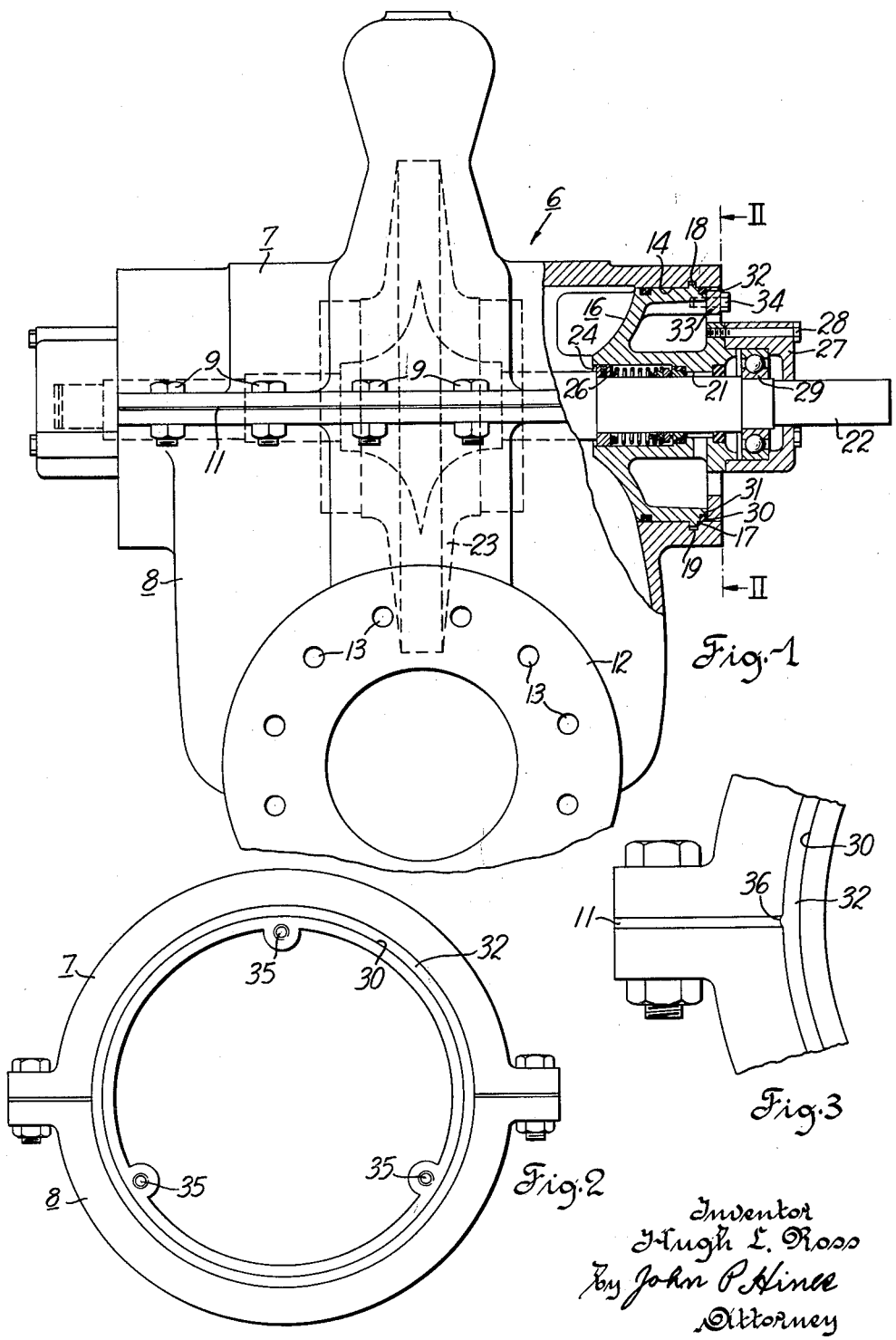

3,160,107
SPLIT CASING PUMP
Hugh L. Ross, Milwaukee, Wis., assignor to Allis-Chalmers Manufacturing Company, Milwaukee, Wis.
Filed Oct. 2, 1962, Ser. No. 227,851
8 Claims. (Cl. 103—111)

This invention pertains to pumps in general and more particularly to centrifugal type pumps wherein the casing is constructed in two parts and connected together along a longitudinal joint to facilitate inspection and repair of the internal parts of the pump.

Pumps of this character are provided with an impeller, positioned in a pumping chamber within the pump casing, which is rotatably supported by a shaft extending longitudinally through the casing and conventionally in line with the plane of the longitudinal casing joint. The casing is provided with aligned end bores which are closed by end closures attached to the pump casing. The end closures have shaft bores therethrough which contain the shaft packing and the shaft bearings are conventionally attached to the outer face of the end closures.

It is necessary to provide a fluid tight seal about each end closure and the pump casing to seal the pressurized fluid within the pump casing from the atmosphere. In some instances, the end closure is provided with a radially directed flange which is bolted to a machined face on the end of the pump casing. In this type of arrangement a gasket can be provided between the casing and end closures. In many instances it is desirable to position the end closure within the end bore of the casing and this requires a different sealing arrangement. In the past, an end closure which is contained within the casing end bores has been provided with one or more annular grooves in the periphery of the end closure and sealing members such as O-rings in these grooves provide a seal between the interior of the pump and the atmosphere. The continued use of the term O-ring should not be taken as a limitation to the scope of the invention and is merely conveniently used as one familiar type of sealing member which could be employed. In either sealing arrangement it all too frequently occurs that a gap is left between the longitudinal seal gasket and either the O-ring or the end gasket. This gap may be caused by either an imperfection in the manufacture of the gaskets or because of improper positioning of the gasket during assembly of the pump. Whatever the cause, the result is an imperfect seal.

An additional difficulty results when the end closure is contained within the end bore of a split casing pump. As is common with all O-ring applications, the ring diameter must be slightly larger than the outside diameter of the surface to be sealed. In the instant example, the O-ring must be slightly larger than the outside diameter of the end closure so that sufficient pressure is exerted on the O-ring when the casing halves are bolted together. Since the O-ring is slightly oversized and must be positioned in the annular peripheral groove, prior to assembly of the casing halves, it quite frequently occurs that a portion of the O-ring is squeezed into the longitudinal joint between the casing halves, thereby preventing a proper seating of the casing seal gasket and also resulting in an imperfect seal.

It is, therefore, the general intention and main object of the subject invention to provide a pump of the hereinfore described type with a seal between the casing and end closures which overcomes the shortcomings mentioned above.

Another object of the subject invention is to provide a pump of the hereinbefore described type with an O-ring seal between the casing and end closure which will not interfere with a proper seating of the longitudinal joint gasket.

A further object of the subject invention is to provide a pump of the hereinbefore described type with an O-ring seal about the inner and outer peripheral surfaces of the casing and end closures, respectively, which may be inserted after the pump casing halves have been assembled.

A more specific object of the subject invention is to provide a pump of the hereinbefore described type wherein a shoulder is provided on the outer end of the peripheral surface of the end closure and wherein this shoulder in conjunction with the inner peripheral surface of the end bore provides an annular groove which is open to the atmosphere and into which an O-ring can be inserted.

These and other objects of the subject invention will become more fully apparent as the following description is read in light of the attached drawing, wherein:

FIG. 1 is a side elevation partly in section of a pump constructed in accordance with the invention;

FIG. 2 is a cross section taken along the lines II—II in FIG. 1; and

FIG. 3 is an enlarged portion of FIG. 2 showing the O-ring seal and longitudinal joint gasket.

Referring to the drawing and particularly FIG. 1, the pump generally designated 6 is comprised of an upper casing half 7 and a lower casing half 8. Each casing half may be provided with a longitudinally disposed flange having aligned bolt holes therethrough in which are received bolts 9 to connect the casing halves together. A seal gasket 11 is provided between the casing halves to seal the interior of the pump along the longitudinal joint from the atmosphere. The pump is provided with a conventional intake flange 12 which may be cast as an integral part of the lower casing half 8. This flange may be provided with circumferentially spaced mounting holes 13.

Since both ends of the pump are substantially identical, only one end has been broken away to show the construction thereof. Each end of the pump is provided with an end bore 14 into which is received an end closure generally designated 16. The end closure may be connected to the pump casing in any conventional manner and in this particular arrangement the end closure is provided with an annular tongue 17 on the peripheral surface thereof which fits into aligned annular grooves 18 and 19 on the inner peripheral surface of each casing half 7 and 8. A shaft bore 21 through the end closure 16 receives the pump shaft 22 to which is rigidly connected a conventional pump impeller 23. A counterbore 24 in the end closure coaxial with the shaft bore 21 receives a conventional mechanical seal generally designated 26. A bearing housing 27 may be rigidly connected to the outer face of the end closure in any conventional manner such as by cap screws 28. Contained within this bearing housing is a conventional shaft bearing 29.

The outer end of the end closure 16 may be provided with an annular shoulder 31 about the periphery thereof. When the end closure is positioned in the end bore 14, as is shown in FIG. 1, this annular shoulder 31 and the inner peripheral surface of the casing halves 7 and 8 define an annular groove 30 which is open to the atmosphere from the end of the pump. An O-ring or similar sealing member 32 is inserted into the annular groove and a pressure ring 33 is then rigidly connected to the end closure to force the O-ring into engagement with the joint between the casing end bore and the end closure shoulder. The ring 33 may be attached to the end closure in any conventional manner and is herein shown as being connected thereto by three cap screws 34 which are turned into threaded bores 35 provided in the outer face of the end closure.

With such an arrangement, it can be seen that the O-ring 32 can be forced into the annular groove 30 by the pressure ring 33 to provide an effective fluid tight seal between the end closure 16 and the end bore 14. Furthermore, since the groove 30 is open to the atmosphere from the end of the pump casing, the O-ring can be inserted after the casing halves are connected together so that the O-ring will not interfere with the proper seating of pump gasket 11 along the longitudinal joint. Furthermore, should there be any imperfections in the size of the gasket 11 or should the gasket shift in assembly, the O-ring when forced into the annular groove 30 will extrude into any unoccupied space, in its plane, in the longitudinal joint such as is shown at 36 in FIG. 3. With such an arrangement, applicant has found that a fluid tight seal does result.

Although only one embodiment of the subject invention has been described and shown herein, it will be obvious to those skilled in the art after reading this disclosure that various modifications of the invention can be employed which incorporate the spirit of the invention disclosed and it is intended to cover such modifications as come within a reasonable interpretation of the claims appended hereto.

Having now particularly described and ascertained the nature of my said invention and the manner in which it is to be performed, I declare that what I claim is:

1. In a pump the combination comprising: a pump casing having axially spaced aligned end bores, said casing constructed of two sections releasably connected along a longitudinal joint; a cylindrical end closure carried in and closing each of said end bores, the inner surfaces of said bores and said end closures having cooperating securing means on the complementary engaging surfaces thereof to prohibit relative axial movement therebetween; an annular shoulder on the outer end of at least one of said end closures, said shoulder and the inner peripheral surface of said bore defining an annular groove with an axially outwardly directed annular opening; a resilient sealing ring in said annular groove; and a pressure ring releasably attached to said pump and closing said annular opening, said pressure ring forcing said sealing ring into fluid sealing engagement with the inner peripheral surface of said bore and said annular shoulder.

2. In a pump the combination comprising: a pump casing having axially spaced aligned end bores, said casing constructed of two sections releasably connected along a longitudinal joint; a cylindrical end closure carried in and closing each of said end bores, the inner surfaces of said bores and said end closures having cooperating securing means on the complementary engaging surfaces thereof to prohibit relative axial movement therebetween; a shaft bearing housing connected to the outer end of at least one of said end closures; an annular shoulder on the outer end of said one of said end closures, said shoulder and the inner peripheral surface of said bore defining an annular groove with an axially outwardly directed annular opening; a resilient sealing ring in said annular groove; and a pressure ring releasably attached to said pump and closing said annular opening, said pressure ring forcing said sealing ring into fluid sealing engagement with the inner peripheral surface of said bore and said annular shoulder, both said sealing ring and said pressure ring having an inside diameter of sufficient size to permit passage thereof about said bearing housing.

3. In a pump the combination comprising: a pump casing having axially spaced aligned end bores, said casing constructed of two sections releasably connected along a longitudinal joint; a cylindrical end closure carried in and closing each of said end bores, the inner surfaces of said bores and said end closures having cooperating securing means on the complementary engaging surfaces thereof to prohibit relative axial movement therebetween; an annular shoulder in the peripheral surface of the outer end of at least one of said end closures and having a diameter less than the diameter of said one of said end closures, said shoulder and the inner peripheral surface of said bore defining an annular groove with an axially outwardly directed annular opening; a resilient sealing ring in said annular groove; and a pressure ring releasably attached to said pump and closing said annular opening, said pressure ring forcing said sealing ring into fluid sealing engagement with the inner peripheral surface of said bore and said annular shoulder.

4. In a pump the combination comprising: a pump casing having axially spaced aligned end bores, said casing constructed of two sections releasably connected along a longitudinal joint; a cylindrical end closure carried in and closing each of said end bores, the inner surfaces of said bores and said end closures having cooperating securing means on the complementary engaging surfaces thereof to prohibit relative axial movement therebetween; an annular shoulder in the peripheral surface of the outer end of at least one of said end closures and having a diameter less than the diameter of said one of said end closures, said shoulder and the inner peripheral surface of said bore defining an annular groove with an axially outwardly directed annular opening; a shaft bearing housing connected to the outer end of said one of said end closures; a resilient sealing ring in said annular groove; and a pressure ring releasably attached to said pump and closing said annular opening, said pressure ring forcing said sealing ring into fluid sealing engagement with the inner peripheral surface of said bore and said annular shoulder, both said sealing ring and said pressure ring having an inside diameter of sufficient size to permit passage thereof about said bearing housing.

5. In a pump the combination comprising: a casing having axially spaced aligned end bores, said casing constructed of two sections releasably connected along a longitudinal joint; an end closure carried in and closing each of said end bores, the inner surfaces of said bores and said end closures having cooperating securing means on the complementary engaging surfaces thereof to prohibit relative axial movement therebetween; means associated with at least one of said end closures and the inner peripheral surface of said bore and forming therewith a groove having an axially outwardly directed opening; a sealing member in said groove; and a pressure member releasably attached to said pump and closing said opening, said pressure member forcing said sealing member into fluid sealing engagement with said one of said end closures and said surface of said bore.

6. In a pump the combination comprising: a casing having axially spaced aligned end bores, said casing constructed of more than one section releasably connected along a longitudinal joint; a pair of end closure members in said end bores, the inner surfaces of said bores and said end closure members having cooperating securing means on the complementary engaging surfaces thereof to prohibit relative axial movement therebetween; a pressure member, said pressure member and one of said end closure members and the inner peripheral surface of one of said bores combining to form a continuous annular groove; a sealing element in said groove; and means connecting said pressure member to said pump casing to force said sealing element into fluid sealing engagement with said surface of said bore and at least one of said end closure members.

7. In a pump the combination comprising: a casing having axially spaced aligned end bores, said casing constructed of more than one section releasably connected along a longitudinal joint; a pair of end closure members in said end bores, the inner surfaces of said bores and said end closure members having cooperating securing means on the complementary engaging surfaces thereof to prohibit relative axial movement therebetween; a pressure member, said pressure member and one of said end closure members and the inner peripheral surface of one of said bores combining to form a pair of axially spaced continuous annular grooves, one of said grooves having an axially outwardly directed opening; a sealing element in each of said grooves; and means connecting said pressure member to said pump casing to force one of said sealing elements into fluid sealing engagement with said surface of said bore and at least one of said end closure members.

8. The combination set forth in claim 7 wherein said axially spaced continuous annular grooves are positioned on opposite sides of said securing means.

References Cited in the file of this patent

UNITED STATES PATENTS

| | | |
|---|---|---|
| 2,480,435 | Aspelin | Aug. 30, 1949 |
| 2,971,468 | McDaniel | Feb. 14, 1961 |
| 2,999,465 | Babb | Sept. 12, 1961 |
| 3,025,800 | Wolfe et al. | Mar. 20, 1962 |

FOREIGN PATENTS

| | | |
|---|---|---|
| 663,293 | Great Britain | Dec. 19, 1951 |